(12) United States Patent
Chen

(10) Patent No.: US 7,733,974 B2
(45) Date of Patent: Jun. 8, 2010

(54) METHOD AND APPARATUS FOR MULTI-SECTOR TRANSMISSION IN A WIRELESS COMMUNICATION NETWORK

(75) Inventor: Wanshi Chen, San Diego, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1159 days.

(21) Appl. No.: 11/317,888

(22) Filed: Dec. 23, 2005

(65) Prior Publication Data

US 2006/0233277 A1    Oct. 19, 2006

Related U.S. Application Data

(63) Continuation-in-part of application No. 11/106,092, filed on Apr. 14, 2005.

(51) Int. Cl.
*H04L 1/02*    (2006.01)

(52) U.S. Cl. .................. 375/267; 375/299; 455/101; 455/132; 455/500; 370/334; 370/342

(58) Field of Classification Search ............... 375/267, 375/299; 455/101, 132, 500; 370/334, 342
See application file for complete search history.

(56) References Cited

U.S. PATENT DOCUMENTS

| | | | |
|---|---|---|---|
| 6,115,427 A | 9/2000 | Calderbank et al. | |
| 6,298,092 B1 * | 10/2001 | Heath et al. | 375/267 |
| 6,542,556 B1 | 4/2003 | Kuchi et al. | |
| 6,618,454 B1 | 9/2003 | Agrawal et al. | |
| 2003/0152174 A1 | 8/2003 | Burke | |

(Continued)

FOREIGN PATENT DOCUMENTS

EP    0898438    2/1999

(Continued)

OTHER PUBLICATIONS

Hosein, "Capacity of Packetized Voice Services over Time-Shared Wireless Packet Data Channels," 24th Annual Joint Conference of the IEEE Computer and Communications Societies, Mar. 15, 2005, pp. 2032-2043, Piscataway, NJ, XP010829309.

(Continued)

*Primary Examiner*—David C Payne
*Assistant Examiner*—Leon Flores
(74) *Attorney, Agent, or Firm*—Coats & Bennett, P.L.L.C.

(57) ABSTRACT

According to transmission control as taught herein, a transmission control system is configured for controlling the transmission of data via two or more data streams to a subscriber in a wireless communication network. In one or more embodiments, the transmission control system comprises a first control circuit to evaluate performance requirements associated with the data and prevailing network conditions, and a second control circuit to determine the number of per-sector data streams to be used for transmitting the data to the subscriber, and to determine whether the per-sector data streams provide spatial multiplexing, spatial diversity, or some mix thereof, based on the evaluation. Such operations may be applied to a variety of network types, including those that use per-sector shared packet data channels. In such cases, multi-sector transmission control may include transmission scheduling coordination across the involved shared channels.

21 Claims, 3 Drawing Sheets

U.S. PATENT DOCUMENTS

| | | | |
|---|---|---|---|
| 2004/0082356 | A1 | 4/2004 | Walton et al. |
| 2004/0121730 | A1 | 6/2004 | Kadous et al. |
| 2004/0202257 | A1 | 10/2004 | Mehta et al. |

FOREIGN PATENT DOCUMENTS

| | | |
|---|---|---|
| WO | WO 01/95531 | 12/2001 |

OTHER PUBLICATIONS

Xiao et al., "Information-theoretic Capacity Analysis in MIMO Distributed Antenna Systems," 57th IEEE Semiannual Vehicular Technology Conference, Apr. 22, 2003, pp. 779-782, vol. 4, New York, NY, XP010862214.

Tang et al., "Coded Transmit Macrodiversity: Block Space-Time Codes over Distributed Antennas," 53rd Vehicular Technology Conference, May 6, 2001, pp. 1435-1438, vol. 2, New York, NY, XP001067201.

Goeckel, D. and Hao, Y., "Macroscopic Space-Time Coding: Motivation, Performance Criteria, and a Class of Orthogonal Designs"; Conference on Information Sciences and Systems; 2003; pp. 68-75; John Hopkins University.

Derryberry, R.T. et. al:, "Transmit diversity in 3G CDMA systems,"; IEEE Communications Magazine; Apr. 2002; pp. 68-75.

Alamouti, S.M., "A simple transmit diversity technique for wireless communications," IEEE J. Select. Areas Communications; Oct. 1998; pp. 1451-1458; vol. 16.

Kaiser, S., "OFDM with code division multiplexing and transmit antenna diversity for mobile communications," Proc. IEE International Symposium on Personal, Indoor and Moble Radio Communications; Sep. 2000; pp. 804-808; London, United Kingdom.

Kaiser, S., "Spatial transmit diversity techniques for broadband OFDM systems," Proc. IEEE Globecom Conference; Nov./Dec. 2000; pp. 1824-1828; San Francisco, USA.

Dammann, A. and Kaiser, S., "Standard conformable antenna diversity techniques for OFDM and its Application to the DVB-T System," Proc. IEEE Globecom Conference; Nov. 2001; pp. 3100-3105; San Antonio, USA.

Kuo, C-H. et. al., "Robust video transmission over wideband wireless channel using space-time coded OFDM systems," Proc. IEEE Wireless Communications and Networking Conference; Mar. 17-21, 2002; pp. 931-936; Orlando, USA.

Yoon, Y.C., "Quadriphase DS_CDMA with pulse shaping and the accuracy of the Gaussian Approcimation for matched filter receiver performance analysis," IEEE Trans. Wireless Communications; Oct. 2002; pp. 761-768; vol. 1.

Damnjanovic, Jelena, "Measure of system load on reverse link," 3GPP2 C30-20021120-016QC; Nov. 20, 2002; 3 pages.

Sohn, I. et. al., "Comparison of SFBC and STBC for transmit diversity in OFDM system," IEEE 802.20 Working Group on Mobile Broadband Wireless Access (IEEE C802.20-03/49); May 5, 2003; 13 pages.

Choi, H. et. al, "STC Macro-Diversity Transmission"; IEEE 802.16 Broadband Wireless Access Working Group; Aug. 18, 2004; 7 pages.

\* cited by examiner

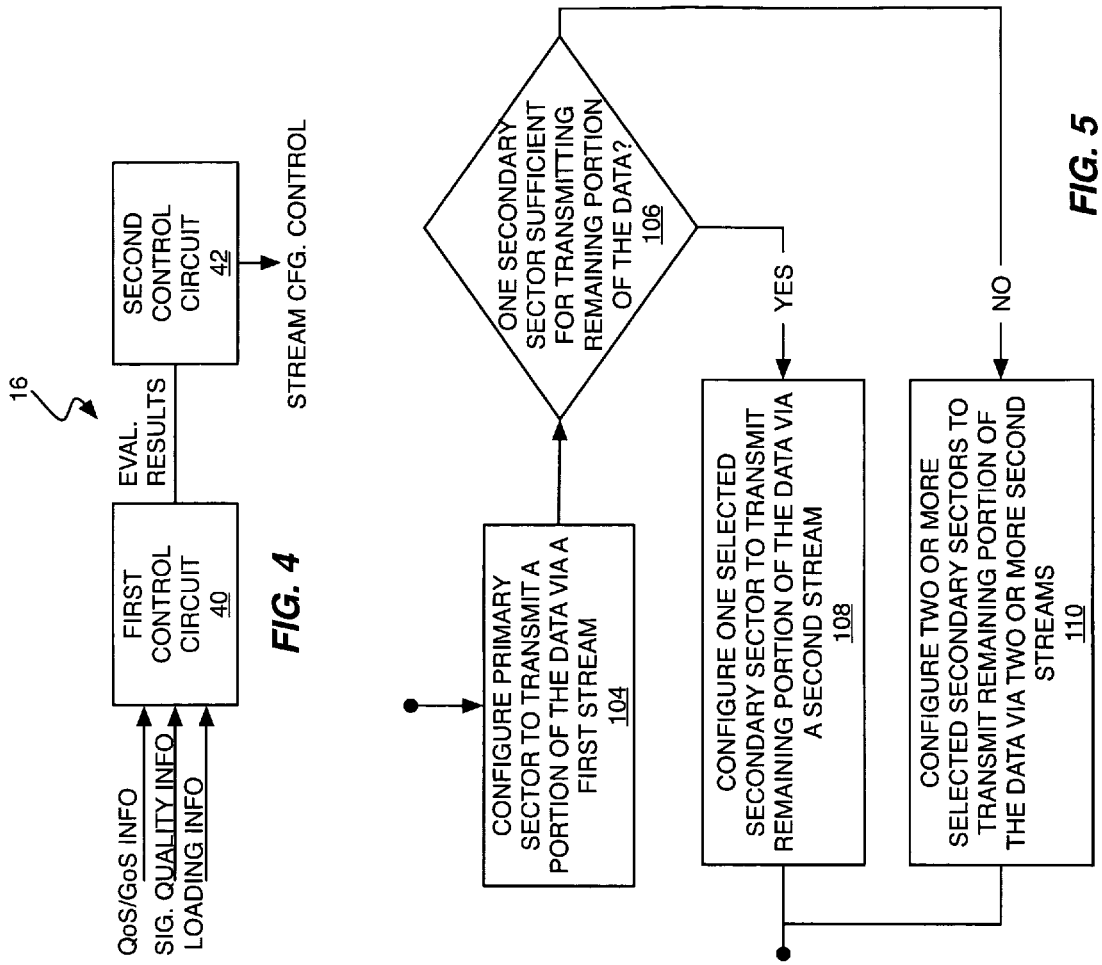
FIG. 4
FIG. 5
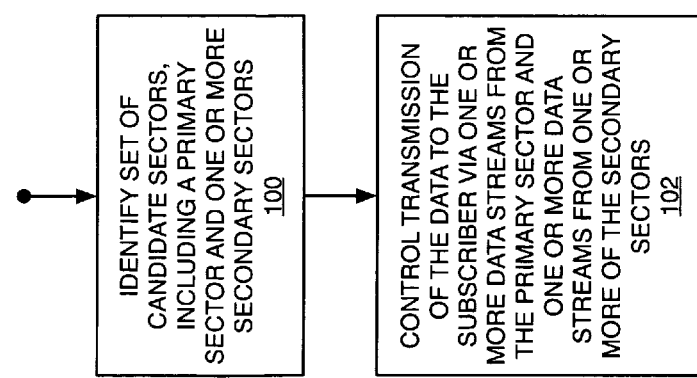
FIG. 3

METHOD AND APPARATUS FOR MULTI-SECTOR TRANSMISSION IN A WIRELESS COMMUNICATION NETWORK

RELATED APPLICATIONS

This application claims priority under 35 U.S.C. § 120 as a continuation-in-part of the pending U.S. patent application filed on 14 Apr. 2005 and assigned Ser. No. 11/106,092, which is entitled "Distributed Transmit Diversity In A Wireless Communication Network" and incorporated by reference herein.

BACKGROUND

The present invention generally relates to wireless communication networks, and particularly relates to multi-sector transmission in such networks.

Some types of wireless communication networks, such as cdma2000, employ a form of diversity transmission known as soft handoff, on forward and/or reverse links between the network transmitter(s) and a targeted subscriber. In soft handoff, the same data is transmitted from two or more sectors, and such transmission is particularly useful in maintaining the subscriber's data connection as the subscriber moves between radio sector coverage areas in the network.

However, in some types of networks, soft handoff is not used, at least for some types of channels. For example, in the 1xEV-DO Rev. A standards, each sector transmits a high-rate shared packet data channel. Multiple subscribers in each sector share the channel according to time-scheduled transmissions managed by a scheduler that typically resides at the physical layer within the base station transmitters being used to serve the sector. Service for a given subscriber is scheduled according to an overall scheduling objective, the subscriber's needs, etc. When the subscriber moves to another sector, the data for that subscriber generally is redirected to the scheduler in that new sector.

Of course, some of the evolving transmission protocols employ spatial transmit diversity for higher-rate packet data services, wherein the same data is transmitted from different antennas, or employ spatial transmit multiplexing, wherein different data for the same subscriber is transmitted from different antennas for a higher aggregate data rate. Various approaches to multiple-input-multiple-output (MIMO) and multiple-input-single-output (MISO) systems represent examples of systems where spatial multiplexing is used to achieve higher aggregate data rates.

SUMMARY

According to transmission control as taught herein, a transmission control system is configured for controlling the transmission of data via two or more data streams to a subscriber in a wireless communication network. In one or more embodiments, the transmission control system comprises a first control circuit to evaluate performance requirements associated with the data and prevailing network conditions, and a second control circuit to determine the number of per-sector data streams to be used for transmitting the data to the subscriber, and to determine whether the per-sector data streams provide spatial multiplexing, spatial diversity, or some mix thereof, based on the evaluation. Generally, the number of streams, and whether the streams provide spatial multiplexing, spatial diversity, or some mix thereof, can be determined or otherwise controlled on a dynamic basis, responsive to changing circumstances and conditions.

The first control circuit is, in one embodiment, configured to evaluate performance requirements by evaluating one or more data rates associated with the data in relation to at least one of per-sector signal quality and per-sector loading. For example, higher aggregate data rates may be supported by using two or more sectors for spatially multiplexed transmission and/or better load balancing can be achieved by sending a portion of the data from one sector and a portion of the data from another sector. Further, where two or more sectors do not independently offer sufficient signal quality to support transmitting a given portion of the data, such sectors may be used in a diversity transmission configuration, such that diversity gain yields the required signal quality relative to the subscriber.

In another embodiment of transmission control as taught herein, a transmission control system is configured for controlling the transmission of data to a subscriber in a wireless communication network, and comprises a first control circuit to identify a set of candidate sectors, including a primary sector and one or more secondary sectors, for serving the subscriber, and a second control circuit to control transmission of the data to the subscriber via one or more data streams from the primary sector and one or more data streams from one or more of the secondary sectors. The second control circuit is, in one embodiment, configured to determine whether to use at least one of the secondary sectors for spatial multiplexing transmission to the subscriber or for spatial diversity transmission to the subscriber as a function of performance requirements associated with the data being transmitted to the user and per-sector conditions.

Of course, the present invention is not limited to the above features and advantages. Those skilled in the art will recognize additional features and advantages upon reading the following detailed description, and upon viewing the accompanying drawings.

BRIEF DESCRIPTION OF THE DRAWINGS

FIG. 3 is a block diagram of one embodiment of processing flow logic for multi-sector transmission control.

FIG. 4 is a block diagram for one embodiment of the transmission control system of FIG. 1.

FIG. 5 is a block diagram of another embodiment of processing flow logic for multi-sector transmission control.

DETAILED DESCRIPTION

Figure 1:
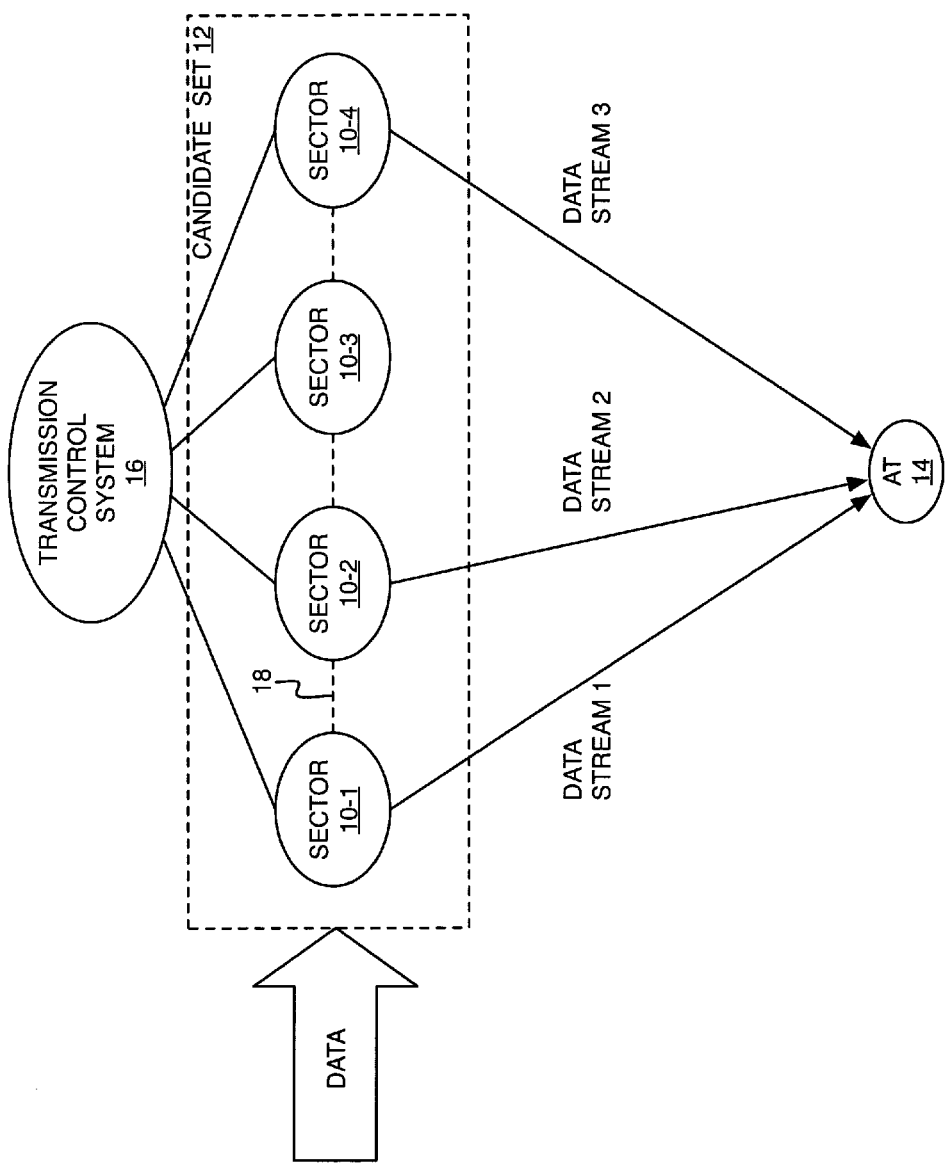
FIG. 1 is a block diagram of a (multi-sector) transmission control system for use in a wireless communication network, according to one embodiment taught herein.

FIG. 1 illustrates the use of two or more sectors 10 within a candidate set 12, for serving an access terminal (AT) 14, wherein the multi-sector transmission operates under the control of a transmission control system 16 that uses multi-sector transmission to transmit data to a given subscriber, e.g., the AT 14. In the illustrated embodiment, the transmission control system 16 appears as a separate entity, having communication links to each sector 10-1, 10-2, 10-3, and 10-4 in the candidate set 12. However, it should be understood that the transmission control system 16 can be embodied in a distributed arrangement across the sectors, in which case sector-to-sector communication links 18 can be used to coordinate multi-sector transmissions.

For example, in the illustration, the transmission control system 16 configures transmission of the data targeted to the access terminal 14 such that it is transmitted in three data streams, a first data stream from the sector 10-1, a second data stream from the sector 10-2, and a third data stream from the sector 10-4. As will be explained in detail later herein, these multiple data streams are configured to provide diversity transmission, spatial multiplexing transmission, or some combination thereof. Such configurations can be set at call admission, but more generally, as taught herein, they change dynamically under control of the transmission control system 16 as a function of, for example, the performance requirements associated with the data to be transmitted and the prevailing network conditions.

Figure 2:
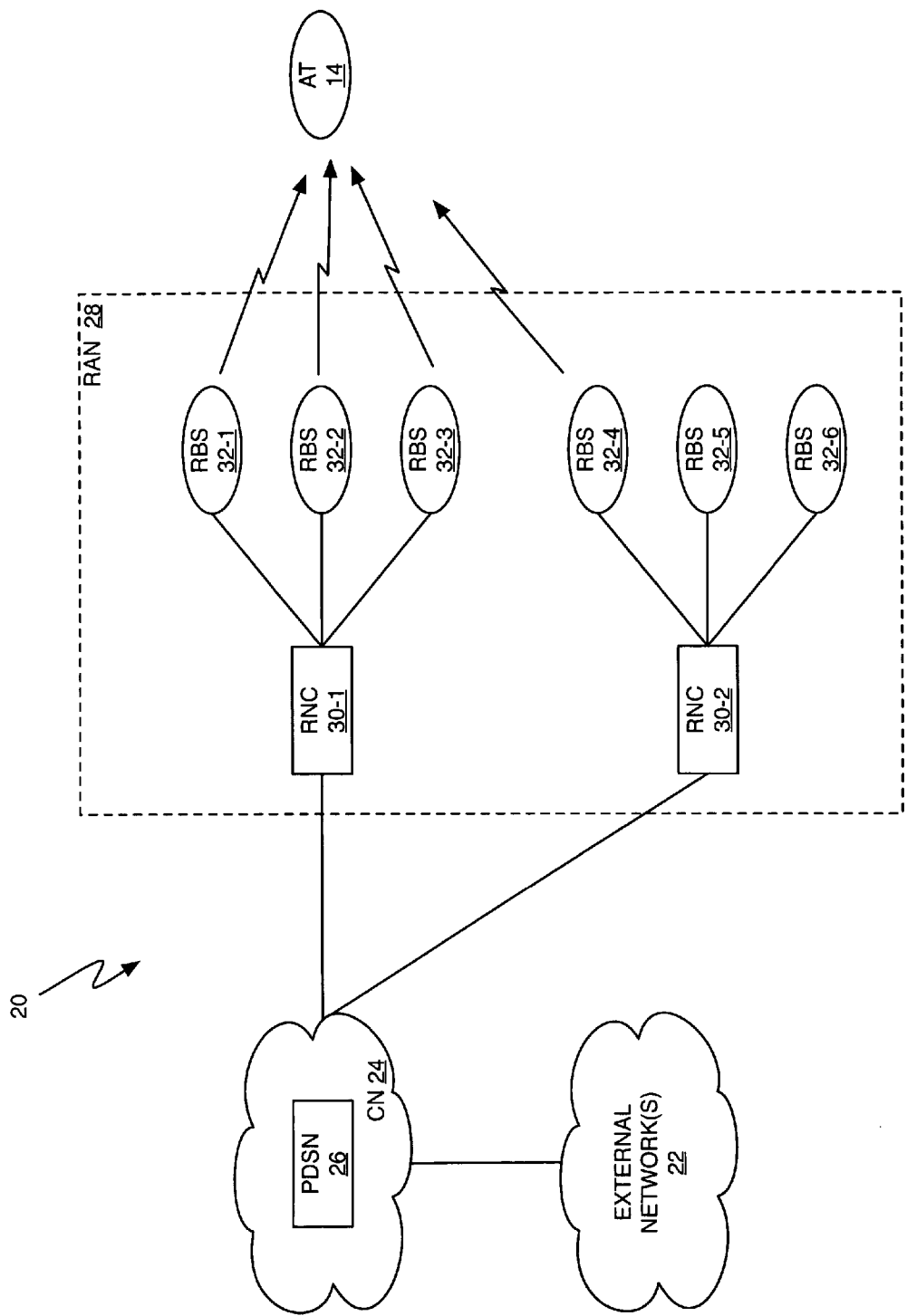
FIG. 2 is a block diagram of a wireless communication network embodying the transmission control system of FIG. 1.

The particular (data) performance requirements and prevailing conditions that bear on configuring the multiple data streams depends, at least to some extent on the type of wireless communication network in which the transmission control system 16 is implemented. For example, FIG. 2 illustrates a wireless communication network 20 that communicatively couples the access terminal 14 to one or more external networks, such as private and/or public packet data networks, like the Internet. To that end, the network 20 comprises a core network (CN) 24, including a packet data serving node (PDSN) 26 or other packet routing entities, and a radio access network (RAN) 28. The RAN 28 includes a number of radio network controllers (RNCs) 30 and a number of radio base stations (RBSs) 32. More particularly, the illustrated RAN 28 includes an RNC 30-1 controlling RBSs 32-1 through 32-3, and an RNC 30-2 controlling RBSs 32-4 through 32-6.

Those skilled in the art will appreciate that greater or fewer RNCs 30 and RBSs 32 may be included in the RAN 28, and that different RNC-to-RBS associations may be implemented. Such details are germane to the broad method of multi-sector transmission as taught herein primarily in terms of practical implementation and desired multi-sector transmission functionality. For example, the transmission control system 16 of FIG. 1 can be functionally integrated into the RNCs 30, such that RNC 30-1 and RNC 30-2 each include a version of the transmission control system 16 for controlling multi-sector transmissions. With that configuration, for example, RNC 30-1 can configure any one or more of the RBSs 30-1 through 30-3 for multi-sector transmission of the data targeted to the access terminal 14.

Of course, the transmission control system 16 can be implemented lower or higher in the network hierarchy. For example, the transmission control system 16 can be implemented in distributed fashion at the RBS level, such that multi-sector transmissions are coordinated between the RBSs 32, or at least those RBSs 32 that operate under control of the same RNC 30. Conversely, rather than being integrated into the RNCs 30, the transmission control system 16 can be implemented as a stand-alone entity at the RNC level of the network hierarchy, wherein it has communication links with one or more of the RNCs 30, for multi-sector transmission control.

Indeed, the transmission control system 16 can be implemented above the RNCs 30 in the network hierarchy. For example, in at least one embodiment of the network 20, the packet control functions (PCFs) linking the RAN 28 to the CN 24 are separated from the RNCs 30, such that one PCF can serve one or more RNCs 30. In such configurations, the transmission control system 16 can be implemented in each such PCF, or functionally distributed across one or more such PCFs. Further, the transmission control system 16 can be implemented above the PCF level, such as by integrating it at the PDSN level in the CN 24. Broadly, it should be understood that multi-sector transmission control can be implemented at different levels in the network hierarchy, and that the particular level of implementation may be determined, for example, in consideration of the desired span of radio coverage area(s) that can be involved in the same multi-sector transmission session, and the amount of inter-entity signaling within the network needed.

Further, it should be understood that the network 20 is itself subject to variations in dependence on the particular standards adopted for its implementation. By way of non-limiting examples, the network 20 may comprise a cellular radio network based on the 1xEV-DO standards, the cdma2000 standards, or the Wideband CDMA (W-CDMA) standards, or may comprise a WiMax network configured according to the 802.16 standards. Thus, the functional combination of RNCs 30—also referred to as base station controllers or BSCs—and RBSs 32—also referred to as Node Bs and/or base transceiver stations or BTSs—may be broadly referred to as base station systems, base stations, access networks, access nodes, wireless access points, etc.

With the above variations in mind, FIG. 3 illustrates one embodiment of multi-sector processing logic that may be implemented in the transmission control system 16 of FIG. 1, as embodied within the network 20 of FIG. 2. For example, in one embodiment of the network 20, each RNC 30 includes a transmission control system 16 that is implemented as hardware, software, or some combination thereof, via one or more processing circuits.

In one embodiment, such processing circuits comprise one or more microprocessor circuits and corresponding stored program instructions that, with respect to FIG. 4, implement a first control circuit 40 to identify the candidate set of sectors to be used for multi-sector transmission, and a second control circuit 42 to configure the multi-sector transmission data streams. For example, in one embodiment, the first control circuit 40 evaluates the performance requirements associated with the data to be transmitted to the subscriber, and further evaluates per-sector signal qualities (with respect to the subscriber) and per-sector loading conditions, to identify the particular sectors that are candidates for use in multi-sector data transmission. In turn, the second control circuit 42 determines which portions of the data are transmitted from which candidate sectors, and whether such transmissions comprise spatial multiplexing transmissions, spatial diversity transmissions, or some combination thereof.

With these considerations in mind, the processing logic of FIG. 3 may be understood in one or more embodiments as representing a dynamic, ongoing multi-sector transmission method, processing "begins" with the identification of a set of candidate sectors, including a primary sector and one or more secondary sectors, for serving the subscriber (Step 100), i.e., the access terminal 14. In one embodiment, the transmission control system 16 identifies the candidate sectors from the subscriber's active set of sectors. For example, the primary sector may be identified as the subscriber's currently serving sector within the active set, and the secondary sectors may be identified as one or more of the remaining active set sectors.

In embodiments where the only one active set sector at a time is denoted as the forward link serving sector, such as in Rev. A of the 1xEV-DO standards, the subscriber's current serving sector is identified as the primary sector for multi-sector transmission operations. In at least one such embodiment, the non-serving sectors in the active set are ranked according to signal quality relative to the subscriber and/or ranked according to sector loading, and one or more secondary sectors are identified based on the ranking. Sector loading evaluations may be based on forward and/or reverse link loading measurements or estimates, such as where the numbers and/or types of subscribers being served in the respective sectors are evaluated to determine comparative sector loading. Alternatively, or additionally, sector loading may be evaluated by considering per-sector transmit power and/or spreading code usage.

With the primary and secondary sectors identified, processing continues with controlling transmission of the data to the subscriber via one or more data streams from the primary sector and one or more data streams from one or more of the secondary sectors (Step 102). Such transmission control comprises, in one embodiment, determining whether to use at least one of the secondary sectors for spatial multiplexing transmission to the subscriber or for spatial diversity transmission to the subscriber as a function of performance requirements associated with the data being transmitted to the user and per-sector radio conditions.

FIG. 5 illustrates more detailed processing logic that may be implemented by the transmission control system 16 in one or more embodiments. With the assumption that the primary and secondary sectors are identified, processing begins with configuring the primary sector to transmit a portion of the subscriber's data via a first data stream (Step 104). The transmission control system 16 then determines whether a given one of the available secondary sectors is, by itself, sufficient for transmitting the remaining portion of the subscriber's data (Step 106). "Sufficient" in this context means that the secondary sector has available resources to support the contemplated transmission, is not overloaded, and offers sufficient signal quality relative to the subscriber for the contemplated transmission.

To that end, the transmission control system 16 can be configured to rank the secondary sectors in terms of their respective signal qualities, such that the transmission control system 16 determines whether the best-ranked secondary sector offers the subscriber a signal quality high enough to support the needed or desired data rate associated with the remaining portion of the data to be transmitted to the subscriber. If so, the transmission control system 16 configures the selected one of the secondary sectors to transmit the remaining portion of the data to the subscriber via a second data stream (Step 108). If not, the transmission control system 16 configures two or more selected ones of the secondary sectors to transmit the remaining portion of the subscriber's data using two or more second data streams transmitted as diversity transmissions from the selected secondary sectors (Step 110). That is, the same second data stream is transmitted from two or more secondary sectors such that diversity gain provides the needed signal quality at the subscriber.

Of course, FIG. 5 serves as a non-limiting example of one embodiment of the transmission control method taught herein. It should be understood that the transmission control system 16 can be configured additionally or alternatively to implement other embodiments of multi-sector data transmission. For example, the subscriber's data may comprise high-rate data associated with a given packet data application running on the access terminal 14. As a non-limiting example, all of the data flowing into the network 20 for delivery to the access terminal 14 may be associated with one high-rate packet data application.

In such cases, the transmission control system 16 may elect to transmit all such data via a single data stream transmitted from the primary sector. Alternatively, for load balancing, for example, the transmission control system 16 may use spatial multiplexing to send a portion of the data via one data stream transmitted from the primary sector and send remaining portions of the data via one or more additional data streams transmitted from one or more of the secondary sectors. In that manner, no one sector is obligated to support the full data rate associated with the aggregate data incoming to the network 20 for the access terminal 14.

As another example, the subscriber's data may be an aggregation of data flows associated with two or more packet data applications running on the access terminal 14. For example, the access terminal 14 may be engaged in a web browsing session, a multi-media streaming session, and a Voice-over-IP (VoIP) session. The data flows for each session generally will have different performance requirements. For example, the data flow for the multi-media streaming session may have a relatively high minimum data rate for a given service quality, while the data flow for the VoIP session may have a relatively low data rate requirement, but may have relatively stringent latency and/or jitter requirements. In such cases, the transmission control system 16 may use the primary sector to transmit a high-rate data stream corresponding to the streaming multi-media data flow, and may use one or more secondary sectors to transmit lower-rate data streams corresponding to the remaining data flows comprising the subscriber's aggregate data.

More broadly, then, in one or more embodiments, the transmission control system 16—or more than one such system working together—configures the primary sector to transmit a relatively high-rate first data stream and configures one or more of the secondary sectors to transmit a relatively low-rate second data stream. In this context, the transmission control system 16 can be configured such that it configures a selected one of the secondary sectors to transmit the second data stream if performance requirements associated with the second data stream can be met using the selected one of the secondary sectors. Otherwise, the transmission control system 16 configures two or more of the secondary sectors for diversity transmission of the second data stream. More generally, the transmission control system 16 can be configured to split the aggregate data across any number of primary and secondary sectors using any combination of spatial multiplexing transmission and spatial diversity transmission, to increase throughput, to better meet Quality-of-Service (QoS) or Grade-of-Service (GoS) requirements, and/or to better balance service loads across the sectors.

For configurations wherein the network 20 provides packet data services via per-sector transmission of a shared packet data channel, the transmission control system 16 may be configured to control multi-sector transmissions based on configuring the primary sector to transmit a first data stream on the shared packet data channel of the primary sector and configuring a selected one of the secondary sectors to transmit a second data stream on the shared packet data channel of said selected one of the secondary sectors. The data streams being transmitted by the shared packet data channels in the primary and secondary sectors may carry different data to achieve a higher aggregate throughput to the subscriber and/or to achieve better load balancing on the shared packet data channels in the different sectors. However, the first and second data streams being transmitted on the shared packet data channels of the primary and secondary sectors may comprise copies, such that transmitting the first data stream from the primary sector and transmitting the second data stream from the selected secondary sector comprises diversity transmission of the same data stream.

For spatial multiplexing on shared packet data channels, the transmission of different data streams on the shared packet data channels in different ones of the candidate sectors may be accomplished without transmission scheduling coordination. This point is particularly true if the data stream in each sector involved in the multi-sector transmission corresponds to a different data flow, i.e., to a different packet data application running on the access terminal 14. However, where related data are being transmitted on different shared packet data channels, and particularly where different shared packet data channels are being used for spatial diversity transmission of the same data stream, inter-sector scheduling coordination is contemplated.

That is, the high-rate shared packet data channels exemplified by the 1xEV-DO, cdma2000, and W-CDMA standards generally use scheduled transmissions to serve a plurality of users on the shared packet data channel being transmitted in each sector. Thus, the transmission control system 16 as described herein may include scheduling control circuits to coordinate the scheduled transmission of data for a given subscriber across the shared packet data channels being transmitted in two or more sectors. Of course, it will be understood that such coordination can be implemented elsewhere in the network 20, such as at the RBS level using RBS-to-RBS communications, which may or may not be routed through the RNCs 30.

More particularly, for multi-sector transmission control within the set of RBSs 32 and corresponding radio sectors under control of a single RNC 30, scheduling coordination may be performed in centralized fashion at the RNC level, or may be performed in distributed fashion across the associated RBSs 32. Further, for multi-sector transmission control within the set of radio sectors corresponding to a given RBS 32, scheduling coordination may be performed within the given RBS 32.

Irrespective of such details, it should be understood broadly that the transmission control system 16, whether implemented in a centralized or distributed manner, can be configured to implement a method for transmitting data to a subscriber in a wireless communication network using multi-sector data transmission. In at least one embodiment, that method comprises evaluating performance requirements associated with the data and prevailing network conditions, determining the number of per-sector data streams to be used for transmitting the data to the subscriber, and determining whether said per-sector data streams provide spatial multiplexing, spatial diversity, or some mix thereof, based on said evaluation. Such evaluation is based on, for example, one or more data rates associated with the data in relation to at least one of per-sector signal quality and per-sector loading.

With the above range of variations in mind, then, it should be understood that the present invention is not limited by the foregoing description, nor is it limited by the accompanying drawings. Instead, the present invention is limited only by the following claims, and their legal equivalents.

What is claimed is:

1. A method for transmitting data to a subscriber in a wireless communication network comprising:
    evaluating performance requirements associated with the data and prevailing network conditions;
    determining the number of per-sector data streams to be used for transmitting the data to the subscriber, and whether said per-sector data streams provide spatial multiplexing, spatial diversity, or some mix thereof, based on said evaluation;
    identifying a set of candidate sectors, including a primary sector and one or more secondary sectors, for serving the subscriber by selecting one or more sectors from the subscriber's active set of sectors as the set of candidate sectors, and designating the primary and secondary sectors from the set of candidate sectors as a function of per-sector signal quality relative to the subscriber; and
    controlling transmission of the data to the subscriber via one or more data streams from the primary sector and one or more data streams from one or more of the secondary sectors, as said determined number of per-sector data streams.

2. The method of claim 1, wherein evaluating the performance requirements comprises evaluating one or more data rates associated with the data in relation to at least one of per-sector signal quality and per-sector loading.

3. a method for transmitting data to a subscriber in a wireless communication network comprising:
    identifying a set of candidate sectors, including a primary sector and one or more secondary sectors, for serving the subscriber by selecting one or more sectors from the subscriber's active set of sectors as the set of candidate sectors and designating the primary and secondary sectors from the set of candidate sectors as a function of per-sector loading and per-sector signal quality relative to the subscriber; and
    controlling transmission of the data to the subscriber via one or more data streams from the primary sector and one or more data streams from one or more of the secondary sectors.

4. The method of claim 3, further comprising determining whether to use at least one of the secondary sectors for spatial multiplexing transmission to the subscriber or for spatial diversity transmission to the subscriber as a function of performance requirements associated with the data being transmitted to the user and per-sector radio conditions.

5. The method of claim 3, wherein controlling transmission of the data to the subscriber via one or more data streams from the primary sector and one or more data streams from one or more of the secondary sectors comprises configuring the primary sector to transmit a relatively high-rate first data stream and configuring one or more of the secondary sectors to transmit a relatively low-rate second data stream.

6. The method of claim 5, wherein configuring one or more of the secondary sectors to transmit a relatively low-rate second data stream comprises configuring a selected one of the secondary sectors to transmit the second data stream if performance requirements associated with the second data stream can be met using said selected one of the secondary sectors, and otherwise comprises diversity transmitting the second data stream from two or more of the secondary sectors.

7. The method of claim 3, wherein the wireless communication network provides packet data services via per-sector transmission of a shared packet data channel, and wherein controlling transmission of the data to the subscriber via one or more data streams from the primary sector and one or more data streams from one or more of the secondary sectors comprises configuring the primary sector to transmit a first data stream on the shared packet data channel of the primary sector and configuring a selected one of the secondary sectors to transmit a second data stream on the shared packet data channel of said selected one of the secondary sectors.

8. The method of claim 7, wherein the first and second data stream comprise copies, such that transmitting the first data stream from the primary sector and transmitting the second data stream from the selected secondary sector comprises diversity transmission of the same data stream.

9. The method of claim 8, further comprising coordinating scheduled data transmissions on the shared packet data channel in the primary sector for the first data stream with scheduled data transmissions on the shared packet data in the selected secondary sector for the second data stream to support diversity transmission of the same data carried in the first and second data streams.

10. The method of claim 3, wherein the wireless communication network comprises a 1xEV-DO network.

11. A transmission control system for controlling transmission of data to a subscriber in a wireless communication network, the transmission control system comprising:
   a first control circuit to evaluate performance requirements associated with the data and prevailing network conditions; and
   a second control circuit to determine the number of per-sector data streams to be used for transmitting the data to the subscriber, and whether said per-sector data streams provide spatial multiplexing, spatial diversity, or some mix thereof, based on said evaluation; and
   wherein said second control circuit is configured to identify a set of candidate sectors, including a primary sector and one or more secondary sectors, for serving the subscriber by selecting one or more sectors from the subscriber's active set of sectors as the set of candidate sectors and designating the primary and secondary sectors from the set of candidate sectors as a function of per-sector signal quality relative to the subscriber, and is configured to control transmission of the data to the subscriber via one or more data streams from the primary sector and one or more data streams from one or more of the secondary sectors, as said determined number of per-sector data streams.

12. The transmission control system of claim 11, wherein the first control circuit is configured to evaluate the performance requirements by evaluating one or more data rates associated with the data in relation to at least one of per-sector signal quality and per-sector loading.

13. A transmission control system for controlling transmission of data to a subscriber in a wireless communication network, the transmission control system comprising:
   a first control circuit to identify a set of candidate sectors, including a primary sector and one or more secondary sectors, for serving the subscriber by selecting one or more sectors from the subscriber's active set of sectors as the set of candidate sectors and designating the primary and secondary sectors from the set of candidate sectors as a function of per-sector loading and per-sector signal quality relative to the subscriber;
   a second control circuit to control transmission of the data to the subscriber via one or more data streams from the primary sector and one or more data streams from one or more of the secondary sectors.

14. The transmission control system of claim 13, wherein the second control circuit is configured to determine whether to use at least one of the secondary sectors for spatial multiplexing transmission to the subscriber or for spatial diversity transmission to the subscriber as a function of performance requirements associated with the data being transmitted to the user and per-sector conditions.

15. The transmission control system of claim 13, wherein the second control circuit is configured to control transmission of the data to the subscriber via one or more data streams from the primary sector and one or more data streams from one or more of the secondary sectors by configuring the primary sector to transmit a relatively high-rate first data stream and configuring one or more of the secondary sectors to transmit a relatively low-rate second data stream.

16. The transmission control system of claim 15, wherein the second control circuit is configured to configure one or more of the secondary sectors to transmit a relatively low-rate second data stream by configuring a selected one of the secondary sectors to transmit the second data stream if performance requirements associated with the second data stream can be met using said selected one of the secondary sectors, and otherwise comprises configuring two or more of the second sectors for diversity transmission of the second data stream.

17. The transmission control system of claim 13, wherein the wireless communication network provides packet data services via per-sector transmission of a shared packet data channel, and wherein the second control circuit is configured to control transmission of the data to the subscriber via one or more data streams from the primary sector and one or more data streams from one or more of the secondary sectors by configuring the primary sector to transmit a first data stream on the shared packet data channel of the primary sector and configuring a selected one of the secondary sectors to transmit a second data stream on the shared packet data channel of said selected one of the secondary sectors.

18. The transmission control system of claim 17, wherein the first and second data stream comprise copies, such that transmitting the first data stream from the primary sector and transmitting the second data stream from the selected secondary sector comprises diversity transmission of the same data stream.

19. The transmission control system of claim 18, wherein the second control circuit is configured to coordinate scheduled data transmissions on the shared packet data channel in the primary sector for the first data stream with scheduled data transmissions on the shared packet data in the selected secondary sector for the second data stream to support diversity transmission of the same data carried in the first and second data streams.

20. The transmission control system of claim 18, further comprising scheduling control circuits in the primary and selected secondary sectors to coordinate scheduled data transmissions on the shared packet data channel in the primary sector for the first data stream with scheduled data transmissions on the shared packet data in the selected secondary sector for the second data stream to support diversity transmission of the same data carried in the first and second data streams.

21. The transmission control system of claim 13, wherein the wireless communication network comprises a 1xEV-DO network.

* * * * *

UNITED STATES PATENT AND TRADEMARK OFFICE
CERTIFICATE OF CORRECTION

PATENT NO. : 7,733,974 B2
APPLICATION NO. : 11/317888
DATED : June 8, 2010
INVENTOR(S) : Chen Page 1 of 1

It is certified that error appears in the above-identified patent and that said Letters Patent is hereby corrected as shown below:

On Page 2, item (56), under "OTHER PUBLICATIONS", in Column 1, Line 13, delete "al:," and insert -- al., --, therefor.

On Page 2, item (56), under "OTHER PUBLICATIONS", in Column 2, Line 2, delete "IEE" and insert -- IEEE --, therefor.

On Page 2, item (56), under "OTHER PUBLICATIONS", in Column 2, Line 3, delete "Moble" and insert -- Mobile --, therefor.

In Column 8, Line 10, in Claim 3, delete "a method" and insert -- A method --, therefor.

In Column 8, Line 67, in Claim 9, after "packet data", insert -- channel --.

Signed and Sealed this
Sixteenth Day of August, 2011

David J. Kappos
*Director of the United States Patent and Trademark Office*